(12) United States Patent
Ertel et al.

(10) Patent No.: US 7,369,606 B1
(45) Date of Patent: May 6, 2008

(54) PHASE ERROR DETECTOR USING I/Q INTERFERENCE CANCELLATION

(75) Inventors: Richard B. Ertel, Midvale, UT (US);
Dan M. Griffin, Bountiful, UT (US);
Johnny M. Harris, Centerville, UT (US); Eric K. Hall, Holliday, UT (US);
Thomas R. Giallorenzi, Riverton, UT (US)

(73) Assignee: L-3 Communications Corporation, New York, NY (US)

( * ) Notice: Subject to any disclaimer, the term of this patent is extended or adjusted under 35 U.S.C. 154(b) by 940 days.

(21) Appl. No.: 10/783,048

(22) Filed: Feb. 19, 2004

(51) Int. Cl.
*H04B 3/46* (2006.01)

(52) U.S. Cl. .................................................. 375/226

(58) Field of Classification Search ................ 375/226
See application file for complete search history.

(56) References Cited

U.S. PATENT DOCUMENTS

| | | | |
|---|---|---|---|
| 4,528,674 A | | 7/1985 | Sweeney et al. ............... 375/1 |
| 5,170,411 A | * | 12/1992 | Ishigaki ...................... 375/147 |
| 5,644,592 A | * | 7/1997 | Divsalar et al. ............ 375/147 |
| 5,898,665 A | | 4/1999 | Sawahashi et al. ......... 370/342 |
| 6,072,770 A | | 6/2000 | Ho et al. ..................... 370/209 |
| 6,081,549 A | | 6/2000 | Shou et al. .................. 375/152 |
| 6,134,260 A | * | 10/2000 | Bottomley et al. ......... 375/130 |
| 6,363,106 B1 | * | 3/2002 | Popovic et al. ............. 375/150 |
| 6,442,217 B1 | * | 8/2002 | Cochran ...................... 375/326 |
| 6,556,619 B2 | | 4/2003 | Imura .......................... 375/147 |
| 6,567,391 B1 | * | 5/2003 | Moon .......................... 370/342 |
| 6,671,266 B1 | * | 12/2003 | Moon et al. ................. 370/342 |
| 6,680,928 B1 | * | 1/2004 | Dent ............................ 370/342 |
| 7,133,469 B2 | * | 11/2006 | Kawai ......................... 375/324 |
| 2003/0076877 A1 | * | 4/2003 | Nakamura ................... 375/150 |
| 2003/0091101 A1 | * | 5/2003 | Lindoff et al. .............. 375/147 |
| 2004/0028013 A1 | * | 2/2004 | Fitton et al. ................. 370/335 |
| 2004/0052301 A1 | * | 3/2004 | Horne .......................... 375/146 |
| 2004/0161019 A1 | * | 8/2004 | Raghavan et al. .......... 375/141 |
| 2004/0252667 A1 | * | 12/2004 | Dent ............................ 370/335 |

\* cited by examiner

*Primary Examiner*—Mohammed Ghayour
*Assistant Examiner*—Nurul M Matin
(74) *Attorney, Agent, or Firm*—Harrington & Smith, PC

(57) ABSTRACT

A method is presented for estimating a phase error for first ($r_I$) and second ($r_Q$) orthogonal signal components spread respectively by different first $c_I$ and second $c_Q$ spreading codes. A cross-despread value IdQ and/or QdI is determined by despreading one signal component with the spreading codes associated with the other signal component ($r_I$ with $c_Q$ or $r_Q$ with $c_I$). In parallel, the same signal component is also despread with its associated spreading code to determine an estimated data symbol for that component. An interference of Q into I or I into Q is calculated and multiplied by the estimated data symbol, and subtracted from the cross-despread value to achieve an estimate of phase error. Preferably, both cross-despread values are obtained, normalized to a common data rate, scaled to maximize signal to noise ratio, and combined into one phase error estimate. A phase error detector includes despreaders, multipliers, and adders to determine the cross-despread value and subtract the interference from it.

20 Claims, 5 Drawing Sheets

PHASE ERROR DETECTOR USING I/Q INTERFERENCE CANCELLATION

FIELD OF THE INVENTION

The present invention relates to estimating and correcting phase error of a received signal wherein an in-phase portion and a quadrature portion of the received signal are independently spread or scaled.

BACKGROUND

In a spread spectrum communication system, symbols or packets are spread and scrambled prior to transmission. While the spreading code used to spread an in-phase (I) component of the transmitted signal s(t) may sometimes be identical to that used for the quadrature (Q) component, generally the scrambling codes differ. The end result is that the I and Q components are identified by different component spreading codes $c_I$ and $c_Q$. A receiver generally acquires at least the initial spreading codes from one or more synchronization channels, which also provide the receiver with phase/frequency to be used for demodulating the received signal r(t). However, the signal is subject to phase errors introduced in the transmission channel that are not accounted for by information provided over the synchronization channel.

Bi-BPSK is a modulation technique wherein each of the in-phase (I) and quadrature (Q) components of a received signal r(t) are treated as independent binary phase shift keyed (BPSK) signals. In general, each of the two BPSK signal components may be independently scaled and/or spread, generally using different component spreading codes $c_I$ and $c_Q$ or scaling factors. Though the data rates over the I and Q channels may differ at any given instant, the chip rate of each (the rate of the spreading sequences in a spread spectrum communication) is generally identical.

A Bi-BPSK constellation is shown in FIG. 1, wherein the constellation points are located at positions (−2, −1), (−2, 1), (2, −1) and (2, 1), and received points are grouped about the true constellation points. Where the I axis is horizontal representing a cosine function and the Q axis is vertical representing a sine function, phase error introduced in a transmission channel tends to rotate the vector defining the point relative to the I and Q axes. Phase error correction seeks to drive the I or Q value to zero by de-rotating the position vector of received points. This clusters received points more tightly about the actual constellation points, reducing error in resolving which of the constellation points the received point truly represents. Correcting for phase error clusters all of the received points more closely toward the constellation points, eliminating ambiguities that may be otherwise cause a received point to be wrongly decided. In the prior art, phase error correction is typically done on the Q channel, since it generally represents the stronger signal, provided the Q channel is spread more. To derotate the phase error, the prior art used a closed loop to drive the product of IdQ*sign(QdQ). Bi-BPSK often takes the approach of using a single carrier phase error term to resolve phase error in both the I and Q channels. That prior art approach is subject to higher phase jitter in the carrier loop when phase error varies over time, leading to unacceptably high symbol error rates in certain cases. The present invention includes a method and apparatus for reducing phase jitter in the carrier loop and for reducing the commensurate symbol error rate.

SUMMARY OF THE INVENTION

The present invention is directed to determining an estimate of phase error in the instance of two orthogonal signal components each spread by a separate component spreading code. Where each signal component is spread by an identical spreading code but scrambled by different scrambling codes, the present invention considers they are spread by separate component spreading codes. The invention includes a method for estimating a phase error, and a phase error detector or estimator that may be a component within a receiver. The estimate of phase error is preferably output to a feedback loop, which the receiver uses to correct phase of subsequently received signals.

The method includes inputting a first signal component spread by a first spreading code and an orthogonal second signal component spread by a second spreading code. What is termed herein as a cross-despread value is determined by despreading the first signal component with the second spreading code. An estimate of interference from the second signal component into the first signal component is then calculated, and the estimate of phase error is determined by subtracting the estimate of interference from the cross-despread value. Preferably, the above is done in parallel for each of the first and second signal components, each result is scaled by a factor to maximize a signal to noise ratio, and the results are combined to yield an estimate of phase error that is accurate at least in the range of small phase errors, and that reduces jitter in the carrier loop as compared to other methods. Details are provided below.

A phase error detector according to the present invention includes first and second despreaders, a discriminator, a multiplier, and an adder. The detector has a first input for receiving a first signal component that is spread with a first component spreading code. The first despreader despreads the first signal component with a second component spreading code associated with a second signal component, where the second signal component is orthogonal to the first. The second despreader is in parallel with the first, and depsreads the first signal component with the first component spreading code. The discriminator has an input coupled to an output of the second despreader, and outputs a data symbol estimate of the first signal component. The multiplier takes an estimate of interference from despreading the first signal component with the second spreading code, and multiplies it by the data symbol estimate. In the example given, the estimate of the data symbol is selected from the set {−1,+1}, so the multiplier serves to determine the sign (+ or −) of the estimate of interference. The adder takes inputs from the multiplier and the first despreader, and subtracts the interference estimate from the first signal as despread by the second component spreading code.

Preferably, the phase error detector includes duplicates of the above components to process each of the first and second signal components as above in parallel, and then combines the two results after scaling to output a phase error estimate that exhibits less jitter than prior art approaches. Various details of the preferred and alternative embodiments are described below.

DETAILED DESCRIPTION

The present invention includes a method and apparatus for estimating phase error for independently spread and scaled in-phase and quadrature Bi-BPSK signals. It is known to despread a received I signal by the Q channel's pseudo-random number (pn) sequence (also known as the Q component spreading code $c_Q$) to estimate phase error. The present invention significantly improves the performance of that prior art approach by subtracting out an estimate of the interference caused by despreading the I data by the Q pn code (or vice versa). The present invention further improves over the prior art in that it combines two terms, I despread with Q and Q despread with I, from which interference has been subtracted from each, and combines them to achieve a more stable estimate of phase error. This approach improves performance as compared to the prior art, and experimental verification of the improvement is quantified at FIGS. 6-7. An underlying assumption in the mathematical analysis below is that the chip rates are identical on both the I and Q channels, though the data rates may and typically do differ. In a spread spectrum system, each pulse in the spreading sequence is termed a chip, and the rate of the sequence of pulses is the chip rate.

Mathematically, the transmitted signal may be expressed in complex baseband notation as:

$$s(t) = \alpha_I b_I(t) c_I(t) + j\alpha_Q b_Q(t) c_Q(t) \quad [1]$$

where $\alpha_I$ and $\alpha_Q$ are the independent scaling amounts for I and Q respectively. The terms $b_I(t)$ and $b_Q(t)$ denote the data symbols, and $c_I(t)$ and $c_Q(t)$ are the independent spreading sequences for I and Q respectively. For Bi-BPSK signals, samples of $b_I(t)$ and $b_Q(t)$ are from the set $\{-1,+1\}$.

Figure 1:
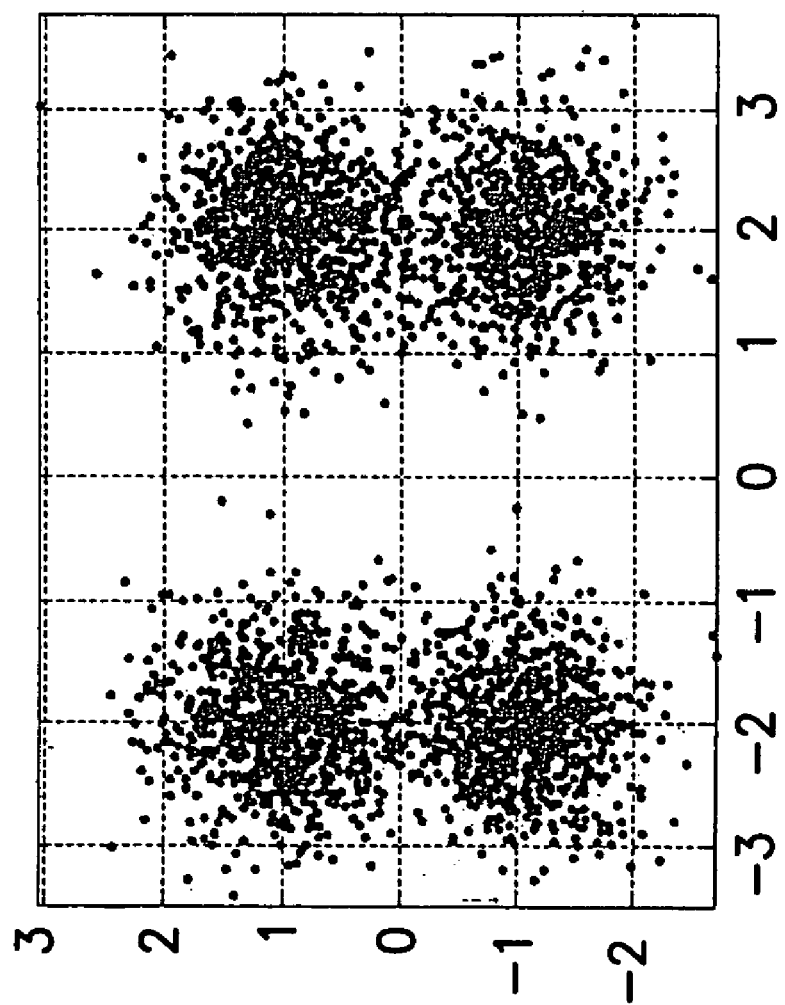
FIG. 1 is a diagram of a Bi-BPSK constellation with four points, each surrounded by a cluster of received bits.

FIG. 1 shows a prior art signal constellation for the case of $\alpha_I=1$ and $\alpha_Q=2$, corresponding to 6 dB more power on I than on Q at the chip level. The constellation points lie at (-2, -1), (-2, 1), (2, -1), and (2, 1) are the constellation points transmitted. The plurality of points clustered about each constellation point represent samples of the received signal for the case of an overall signal to noise ratio of 10 dB.

Figure 2:
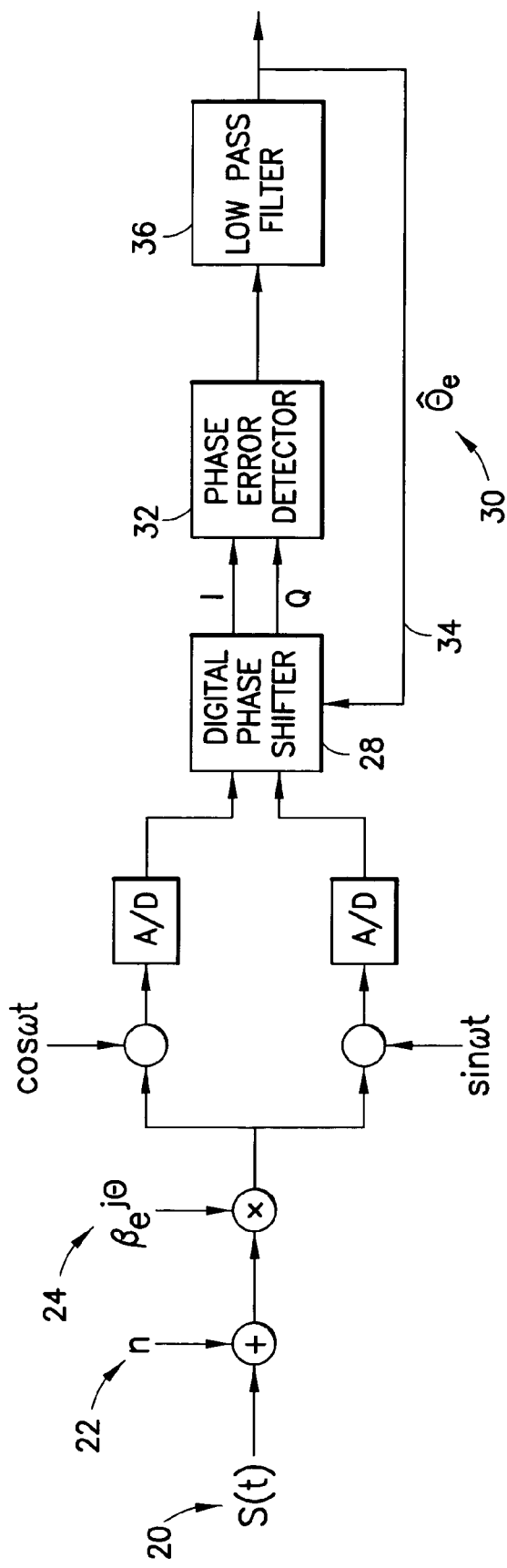
FIG. 2 is a block diagram of a receiver in which phase errors are estimated according to the present invention.

Assume that a received signal r(t) is a scaled, phase-rotated version of the transmitted signal s(t) with complex additive noise, $n_c = n_I + jn_Q$. This is shown in block diagram form at FIG. 2, wherein a transmitted signal s(t) 20 is corrupted with noise 22 and phase error 24 prior to processing at a receiver 26. The received signal r(t) is demodulated, converted to digital, and input into a digital phase shifter 28 that applies an estimate of the phase error $\hat{\theta}_e$ (30) to the I and Q components. The estimate of the phase error $\hat{\theta}_e$ is calculated in the phase error detector 32 and fed back through a carrier loop 34, preferably after attenuation by a low pass filter 36. In this case, the received signal r(t) may be expressed as follows:

$$r = \beta s e^{j\theta} + n_c = \beta[\alpha_I b_I c_I + j\alpha_Q b_Q c_Q][\cos\theta + j\sin\theta] + [n_I + jn_Q] =$$

$$\beta[\alpha_I b_I c_I \cos\theta - \alpha_Q b_Q c_Q \sin\theta] +$$

$$j\beta[\alpha_Q b_Q c_Q \cos\theta + \alpha_I b_I c_I \sin\theta] + [n_I + jn_Q] = r_I + jr_Q$$

where $r_I = \beta[\alpha_I b_I c_I \cos\theta - \alpha_Q b_Q c_Q \sin\theta] + n_I$, $r_Q = \beta[\alpha_Q b_Q c_Q \cos\theta + \alpha_I b_I c_I \sin\theta] + n_Q$. [3]

For brevity, time dependence (t) is not shown explicitly with the variables to which it applies (r, s, b, and c above), but that time dependence remains implicit within the assorted variable names in the equations above and in the following description.

Figure 3:
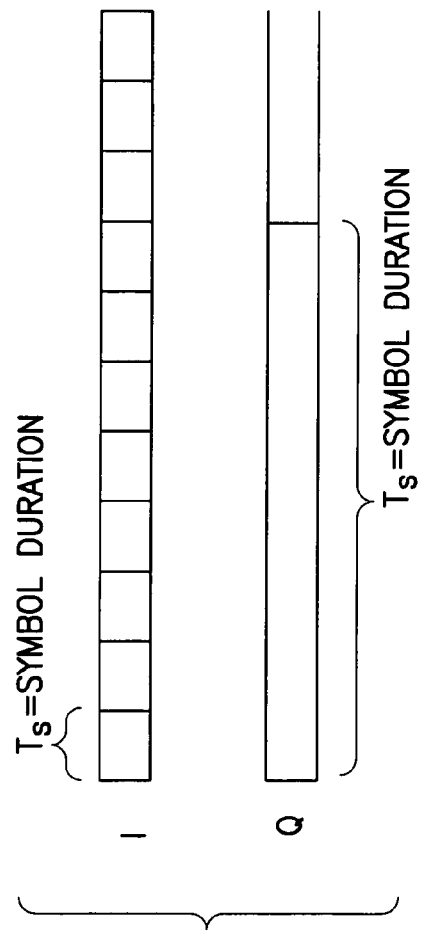
FIG. 3 is a schematic illustrating different data rates on the I and Q channels that the preferred embodiment of the present invention resolves.

It has been noted that both the I and Q channels are at the same chip rate, but may carry different data rates. FIG. 3 illustrates the dilemma, wherein the I channel is running at eight times the rate of the Q channel. The present invention despreads one channel with the spreading code of the other, calculates an interference caused by despreading in that manner, and subtracts that interference from the cross-despread value to determine an estimate of phase error. In a preferred embodiment, this interference cancellation is performed on both channels, and the interference-free estimates are weighted and combined to reduce jitter. However, they cannot be directly combined due to the different data rates. As such, a common rate is found by, in the case of FIG. 3, virtually parsing the Q channel into intervals that correspond with the frames of the I channel. This aspect is described more completely below in the description of FIG. 4.

Figure 4:
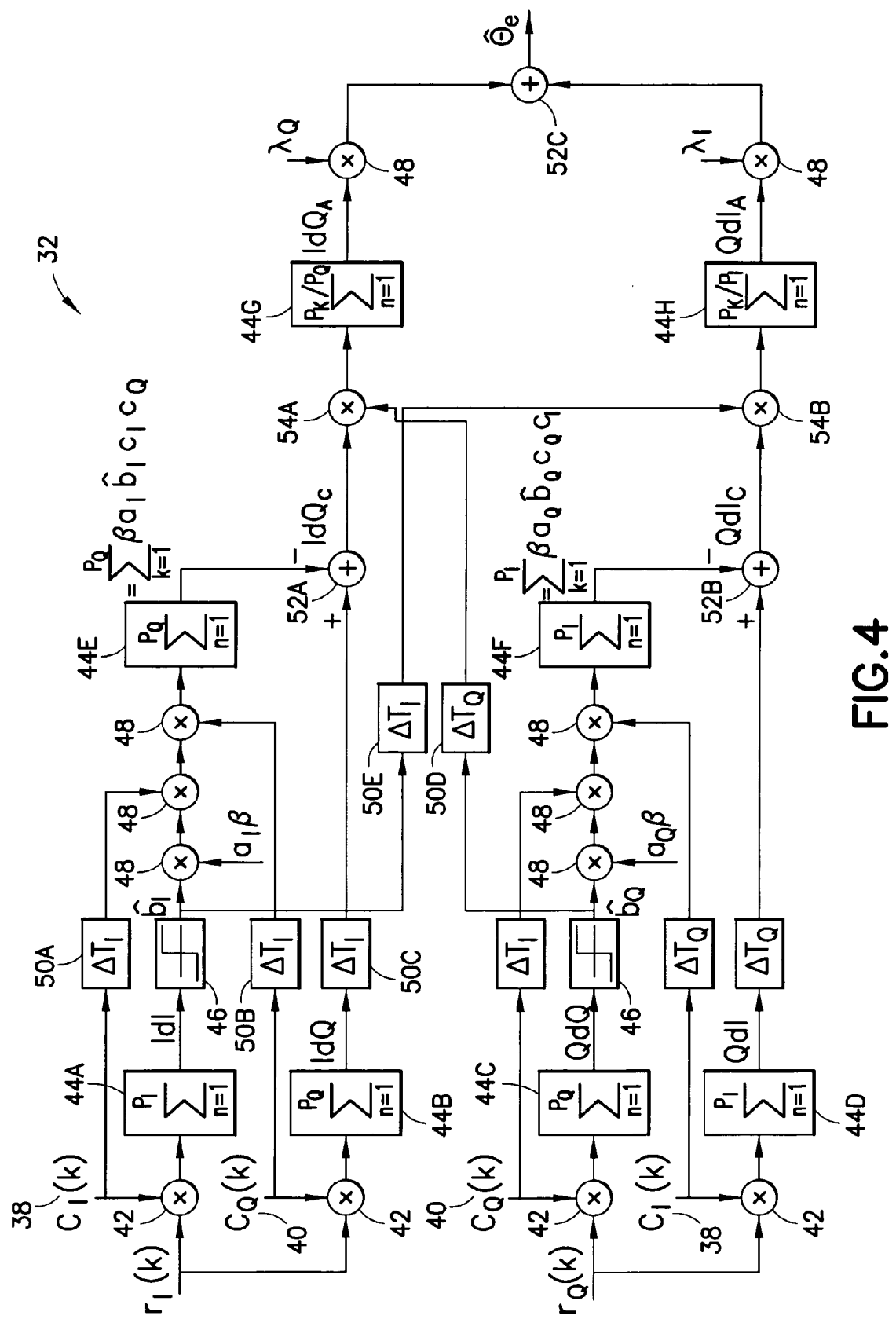
FIG. 4 is a block diagram showing details of the phase error detector of FIG. 2 in accordance with the preferred embodiment of the present invention.

The phase error detector 32 is shown in detail at FIG. 4. Each of the input signal components $r_I$ and $r_Q$ are input into the phase error detector 32 and split into two streams. Both signal components are preferably processed in like fashion in parallel. For $r_I$, a first stream is despread with a first spreading code 38 that is associated with the I component and designated $c_I(k)$; and a second stream is despread with a second spreading code 40 that is associated with the opposing Q component and designated $c_Q(k)$. While only one multiplier 42 is depicted in FIG. 4 for each of the streams, in practice the preferred embodiment would impose one multiplier 42 for each of the various k spreading codes used to despread the signal, where k is an integer greater than one. In the embodiment of FIG. 4, the multipliers 42 having r(k) and c(k) as inputs operate as sign inverters only.

Along the first stream associated with the I component of the received signal $r_I$, the despread signals $r_I c_I$ are combined at a first I summing block 44A (that operates to perform $$\sum_{n=1}^{P_I} r_I c_I)$$

for all of the $P_I$ chips per symbol, since the first spreading code $c_I(k)$ 38 was used for the despreading. The output of the first I summing block 44A is the despread value IdI (the I signal component despread with the spreading code associated at the transmitter with the I signal component), detailed below at equation [4]. Along the second stream associated with the I component of the received signal $r_I$, the despread signal $r_I c_Q$ is combined at a second I summing block 44B (that operates to perform $$\left. \sum_{n=1}^{P_Q} r_I c_Q \right)$$

for all of the $P_Q$ chips per symbol, since the second spreading code $c_Q$ (40) was used for the despreading. As noted in conjunction with FIG. 3, the chip rate is the same for both the I and Q channels though the data rate, and hence the processing gains, may differ. The output of the second I summing block 44B is termed the cross-despread value IdQ (the I signal component despread with the spreading code associated at the transmitter with the Q signal component), detailed below at equation [5].

In a preferred embodiment, the Q component of the received signal is similarly processed. For $r_Q$, a first stream is despread with the second spreading code 40 associated with the Q component and designated $c_Q(k)$, and a second stream is despread with the first spreading code 38 associated with the opposing I component and designated $c_I(k)$. Along a first stream associated with the Q component of the received signal $r_Q$, the despread signal $r_Q c_Q$ is combined at a first Q summing block 44C (that operates to perform $$\left. \sum_{n=1}^{P_Q} r_I c_Q \right)$$

for all of the $P_Q$ chips per symbol. The output of the first Q summing block 44C is the despread value QdQ, detailed below at equation [7]. Along the second stream associated with the Q component of the received signal $r_Q$, the despread signal $r_Q c_I$ is combined at a second Q summing block 44D for all of the $P_I$ chips per symbol. As with the I streams, the processing gains may differ between the first and second Q streams due to the different spreading codes. The second Q summing block 44D (that operates to perform $$\left. \sum_{n=1}^{P_I} r_Q c_I \right)$$

outputs the cross-despread value QdI, detailed below at equation [6].

Substituting equations [3] yields the possible despread values, namely, $$IdI = \sum_{k=1}^{P_I} r_I c_I = \beta \alpha_I b_I P_I \cos\theta - \sum_{k=1}^{P_I} [\beta \alpha_Q b_Q c_Q c_I \sin\theta + n_I c_I] \quad [4]$$

$$IdQ = \sum_{k=1}^{P_Q} r_I c_Q = \sum_{k=1}^{P_Q} [\beta \alpha_I b_I c_I c_Q \cos\theta + n_I c_Q] - \beta \alpha_Q b_Q P_Q \sin\theta \quad [5]$$

$$QdI = \sum_{k=1}^{P_I} r_Q c_I = \sum_{k=1}^{P_I} [\beta \alpha_Q b_Q c_Q c_I \cos\theta + n_Q c_I] + \beta \alpha_I b_I P_I \sin\theta \quad [6]$$

$$QdQ = \sum_{k=1}^{P_Q} r_I c_Q = \beta \alpha_Q b_Q P_Q \cos\theta + \sum_{k=1}^{P_Q} [\beta \alpha_I b_I c_I c_Q \sin\theta + n_Q c_Q]. \quad [7]$$

Each of the above despread values are bit weighted by the scaling amount α and the processing gain P for the noted I or Q channels. For clarity, the terms IdQ and QdI are referred to as cross-despread values since they include cross-correlation terms due to despreading with the codes associated with the orthogonally opposed signal component.

Assuming that θ is small and sufficient signal to noise ratio, estimates of the data symbols $\hat{b}_I$ and $\hat{b}_Q$ may be found using:

$$\hat{b}_I = \begin{cases} -1 & : IdI < 0 \\ 1 & : IdI \geq 0, \end{cases} \quad \hat{b}_Q = \begin{cases} -1 & : QdQ < 0 \\ 1 & : QdQ \geq 0. \end{cases} \quad [8]$$

In FIG. 4, a discriminator 46 in series with the first I summing block 44A evaluates IdI and outputs the estimate of the I data symbol $\hat{b}_I$ in accordance with equation [8]. This is a hard decision. Similarly, another discriminator 46 in series with the first Q summing block 44C evaluates the value of QdQ and outputs a hard-decision estimate of the Q data symbol $\hat{b}_Q$.

Using the estimates of equation [8], the cross terms may be removed from the cross-despread values IdQ and QdI, by computing $$IdQ_C = IdQ - \sum_{k=1}^{P_Q} \beta \alpha_I \hat{b}_I c_I c_Q \approx \quad [9]$$

$$\sum_{k=1}^{P_Q} [\beta \alpha_I b_I c_I c_Q (\cos\theta - 1) + n_I c_Q] - \beta \alpha_Q b_Q P_Q \sin\theta$$

$$QdI_C = QdI - \sum_{k=1}^{P_I} \beta \alpha_Q \hat{b}_Q c_Q c_I \approx \quad [10]$$

$$\sum_{k=1}^{P_I} [\beta \alpha_Q b_Q c_Q c_I (\cos\theta - 1) + n_Q c_I] + \beta \alpha_I b_I P_I \sin\theta$$

where the subscript c is used to denote cross correlation (interference) has been substantially removed. Equality in equations [9] and [10] is satisfied only if the data symbol estimates $\hat{b}_I$ and $\hat{b}_Q$ are correct. This effectively reduces the interference terms by a factor of (cos θ−1)/cos θ, which is significant when θ is small. The area in which phase error is small is the area of greatest interest, as the object is to continuously correct phase error and drive it as near as possible to zero. For a continuously operating detector 32 operating on numerous data samples, any phase errors that are initially large will be brought within a small error range in a relatively short time. Thus, a phase error detector 32 must be precise in the area where θ is small.

In FIG. 4, the second term to the right of the equality sign in equation [9], namely $$\sum_{k=1}^{P_Q} \beta \alpha_I \hat{b}_I c_I c_Q,$$

is achieved by multiplying the data estimate $\hat{b}_I$ from the discriminator 46 by the terms $\alpha_I\beta$ as in equation [2] (which is known at the receiver), further multiplying by the spreading code $c_I(k)$ after that code is delayed at a delay block 50A (to synchronize with its related data estimate with which it is combined), and further multiplying that product ($\hat{b}_I\beta\alpha_Ic_I$) by a cross spreading code $c_Q$, similarly delayed at a delay block 50B. FIG. 4 shows a series of three multipliers 48 used to apply the interference term to the data estimate, though other functionally similar embodiments may be used. These products are summed at a third I summing block 44E over all the $P_Q$ chips per symbol, then inverted (in sign) and input into an adder 52A. The other input to that same adder 52A is the output of the second I summing block 44B, delayed at a third delay block 50C so that the inputs married at the adder 52A correlate to the same symbol. The term IdQ in equation [9] is the cross-despread value that is output from the second I summing block 44B. The term $$\sum_{k=1}^{P_Q} \beta \alpha_I \hat{b}_I c_I c_Q$$

in equation [9] is the data estimate with interference that is inverted (in sign) and input from the third I summing block 44E. The adder 52A combines the two terms as represented in equation [9] and outputs the value $IdQ_C$, which is a despread value with interference from being despread with the component spreading codes $c_Q$ of the opposed signal component removed.

Processing on the $r_Q(k)$ signal component embodies the operation of equation [10], and mirrors that done on the $r_I(k)$ signal component that embodies the operation of equation [9]. Similar processing in parallel is shown in FIG. 4. The output $$\left(\sum_{k=1}^{P_I} \beta \alpha_Q \hat{b}_Q c_Q c_I\right)$$

of a third Q summing block 44F is inverted (in sign) and added to the output (QdI) of the second Q summing block 44D. The result from adding these values at an adder 52B is the despread value $QdI_C$ of equation [10], which substantially lacks interference from being despread with the component spreading codes $c_I$ of the opposing signal component.

When $\theta$ is sufficiently small, then equations [9] and [10] reduce to:

$$IdQ_C \approx -\beta\alpha_Q b_Q P_Q \sin\theta + \sum_{k=1}^{P_Q} n_I c_Q \qquad [11]$$

$$QdI_C \approx +\beta\alpha_I b_I P_I \sin\theta + \sum_{k=1}^{P_I} n_Q c_I \qquad [12]$$

Due to the different component spreading codes $c_I(k)$ and $c_Q(k)$, these estimates are computed at different rates commensurate with the data rate difference illustrated in FIG. 3. To compute values at the same rate, the receiver 26 preferably uses the estimated data symbols $\hat{b}_I$ and $\hat{b}_Q$ to remove the $b_I$ and $b_Q$ terms, at which point multiple samples may be accumulated in first-in/first-out registers of differing depths to normalize the streams to a common data rate. Since $b \in \{-1, 1\}$, then $b^*\hat{b}=1$. In particular, let $P_K=LCM(P_I,P_Q)$, wherein $LCM(P_I, P_Q)$ represents the least common multiple of $P_I$ and $P_Q$:

$$IdQ_A = \sum_{k=1}^{P_K/P_Q} IdQ_C \hat{b}_Q \approx -\beta\alpha_Q P_K \sin\theta + \sum_{k=1}^{P_K/P_Q}\left[\hat{b}_Q \sum_{k=1}^{P_Q} n_I c_Q\right] = \qquad [13]$$

$$k\alpha_Q \sin\theta + n_{IA}$$

$$QdI_A = \qquad [14]$$

$$\sum_{k=1}^{P_K/P_I} QdI_C \hat{b}_I \approx +\beta\alpha_I P_K \sin\theta + \sum_{k=1}^{P_K/P_I}\left[\hat{b}_I \sum_{k=1}^{P_I} n_Q c_I\right] = k\alpha_I \sin\theta + n_{QA}$$

Returning to FIG. 4, the output $IdQ_C$ of the adder 52A is multiplied by the data estimate $\hat{b}_Q$, which is taken from the opposing $r_Q(k)$ signal component, and delayed at a fourth delay block 50D to correlate symbols. The outputs of the related multiplier 54A are summed over all of the $P_K/P_Q$ at a fourth I summing block 44G (that operates to perform $$\sum_{k=1}^{P_K/P_Q} IdQ_c \hat{b}_Q\right),$$

which outputs $IdQ_A$ as in equation [13] above. Similar processing occurs in parallel for the Q component of the signal $r_Q(k)$. Specifically, $\hat{b}_I$ from the opposing orthogonal signal component $r_I(k)$ is delayed at a fifth delay block 50E and multiplied at a multiplier 54B with the output $QdI_C$ of the related adder 52B. A fourth Q summing block 44H (that operates to perform $$\sum_{k=1}^{P_K/P_I} QdI_c \hat{b}_I\right)$$

sums over all of the $P_K/P_I$ and outputs $QdI_A$ as in equation [14] above. Using $P_K$ drives the two signals $IdQ_A$ and $QdI_A$ to a common rate so that they may later be directly compared or combined.

Since the two noise terms $n_{IA}$ and $n_{QA}$ of equations [13] and [14] are the accumulation of noise samples over the same length, and it is assumed that the original noise is circularly symmetric, then $n_{IA}$ and $n_{QA}$ have the same variance. Therefore, provided that the probability of decision errors is small on the I and Q samples, the relative quality of the estimates $IdQ_A$ and $QdI_A$ is determined by the ratio of the scaling amounts $\alpha_I$ over $\alpha_Q$. For example, when $\alpha_I > \alpha_Q$, then $IdQ_A$ provides a better carrier phase loop detector signal.

In the preferred embodiment of FIG. 4, both estimates are combined using a maximum ratio combining approach whereby the phase error detector 32 output may be computed using $$\hat{\theta}_e = \hat{\lambda}_I Q dI_A - \hat{\lambda}_Q I dQ_A$$
$$= [\beta\lambda_I \alpha_I P_K + \beta\lambda_Q \alpha_Q P_K]\sin\theta$$
$$= \beta P_K [\lambda_I \alpha_I + \lambda_Q \alpha_Q]\sin\theta$$

where $\lambda_I$ and $\lambda_Q$ are scaling factors that are used to combine the individual estimates in order to maximize the signal to noise ratio of the estimate. The scaling factors $\lambda_I$ and $\lambda_Q$ are functions of the scaling amounts $\alpha_I$ and $\alpha_Q$. In FIG. 4, the scaling factor $\lambda_I$ is applied along the $r_Q$ signal component stream, and the scaling factor $\lambda_Q$ is applied along the $r_I$ signal component stream. The products are then combined at an adder 52C (one input inverted in certain embodiments) to yield the estimate of the phase error $\hat{\theta}_e$, that is fed back in FIG. 2 to the digital phase shifter 28 via the filter 36 and carrier loop 34.

The above approach may be streamlined (less hardware) by determining the estimate of the phase error $\hat{\theta}_e$ using only one or the other of the I and Q channels. Certain prior art circuits take such a one-channel approach by assuming (generally valid) that the stronger signal is on the Q channel, $$\left(\frac{E_b}{N_o}\right)_Q > \left(\frac{E_b}{N_0}\right)_I,$$

and so the prior art uses only the Q channel to estimate the phase error. Mathematically, the prior art approach is $\hat{\theta}_e = \text{sign}(QdQ) \times IdQ$, where $\text{sign}(QdQ)$ is from the set $\{-1, +1\}$. The present invention improves on the prior art in the one-channel approach by removing the cross correlation terms (subtracting the interference) from the I channel on the Q estimate, or vice versa. Mathematically, the one-channel embodiment of the present invention may be represented as either $\hat{\theta}_e = \text{sign}(IdI) \times QdI_c$ or $\hat{\theta}_e = \text{sign}(QdQ) \times IdQ_c$, wherein $\text{sign}(QdQ)$ and $\text{sign}(IdI)$ are from the set $\{-1, +1\}$. In FIG. 4, the discriminator 46 outputs $\text{sign}(IdI)$ by converting $IdI$ to $\hat{b}_I$ (or outputs $\text{sign}(QdQ)$ by converting $QdQ$ to $\hat{b}_Q$), where $\hat{b}_I$ and $\hat{b}_Q$ are from the set $\{-1, +1\}$ per equation [8]. Each of these one-channel approaches offer a more accurate estimate of the phase error as compared to the prior art, at the cost of increased complexity. Alternatively, the above one-channel phase error estimates may be scaled versions of the products shown, rather than the products directly. The preferred embodiment uses both of the above interference-corrected products, scaled to provide maximum signal to noise ratio SNR, and summed, to achieve a more stable $\hat{\theta}_e$ that reduces variance in the phase error detector 32, and consequently reduces jitter in the carrier loop 34.

Figure 5:
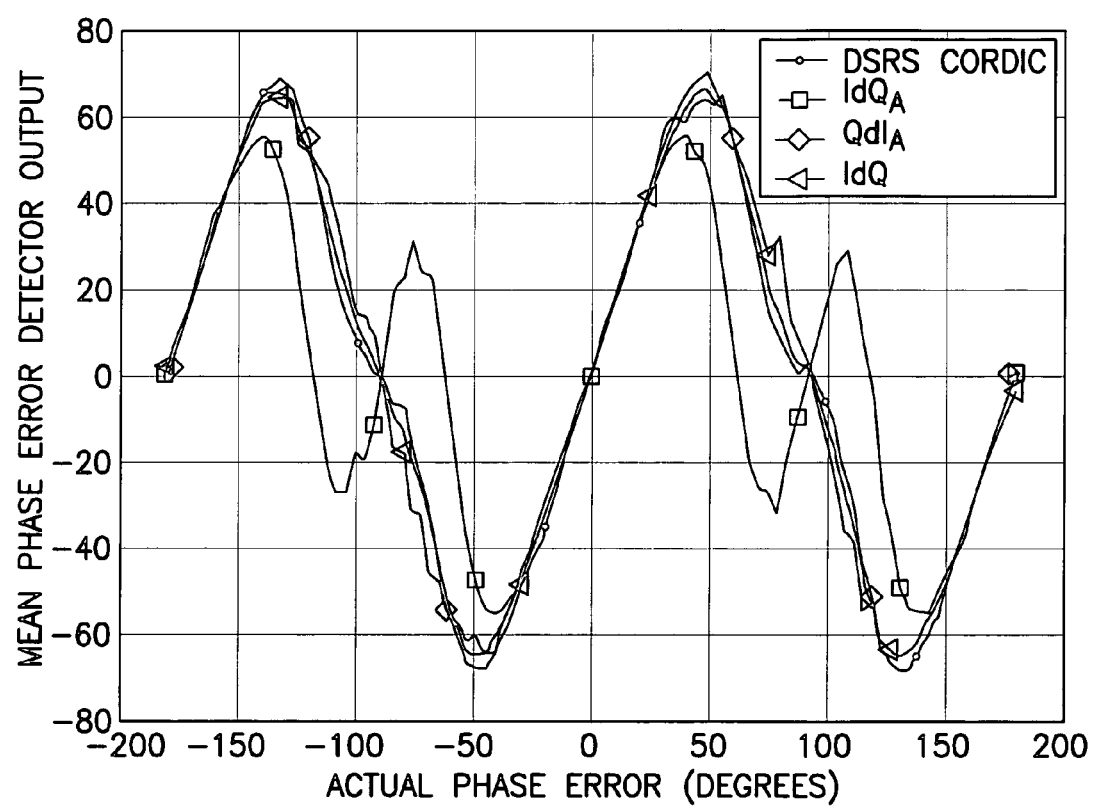
FIG. 5 is a graph showing phase error detector output versus true phase angle error for four phase detectors: two according to the present invention, one according to a co-pending invention, and one according to the prior art.

The inventors have performed simulations on the one-channel embodiments of the present invention as compared to another of their inventions (co-pending) and to the prior art approach described above in the Background section. FIG. 5 shows phase error estimates (phase error detector output) versus true phase angle error for the interference cancellation methods using $IdQ_A$ and $QdI_A$, an approach of U.S. patent application Ser. No. 10/763,855, filed on Jan. 22, 2004, assigned to the present assignee and hereinafter termed the DSRS CORDIC approach, and the prior art approach which outputs the received I data despread with the Q pn-code without interference cancellation. The results shown are for the case when $\alpha_I=2$ and $\alpha_Q=1$ corresponding to 6 dB more power on the I channel than on the Q channel, and for an overall SNR of 10 dB. All four of the S-curves in FIG. 5 cross zero at zero degrees phase error, indicating that the different techniques will drive the carrier phase error to zero. However, the resulting carrier loop phase jitter is a function of the variance of the samples used to compute the s-curves of FIG. 5.

Figure 6:
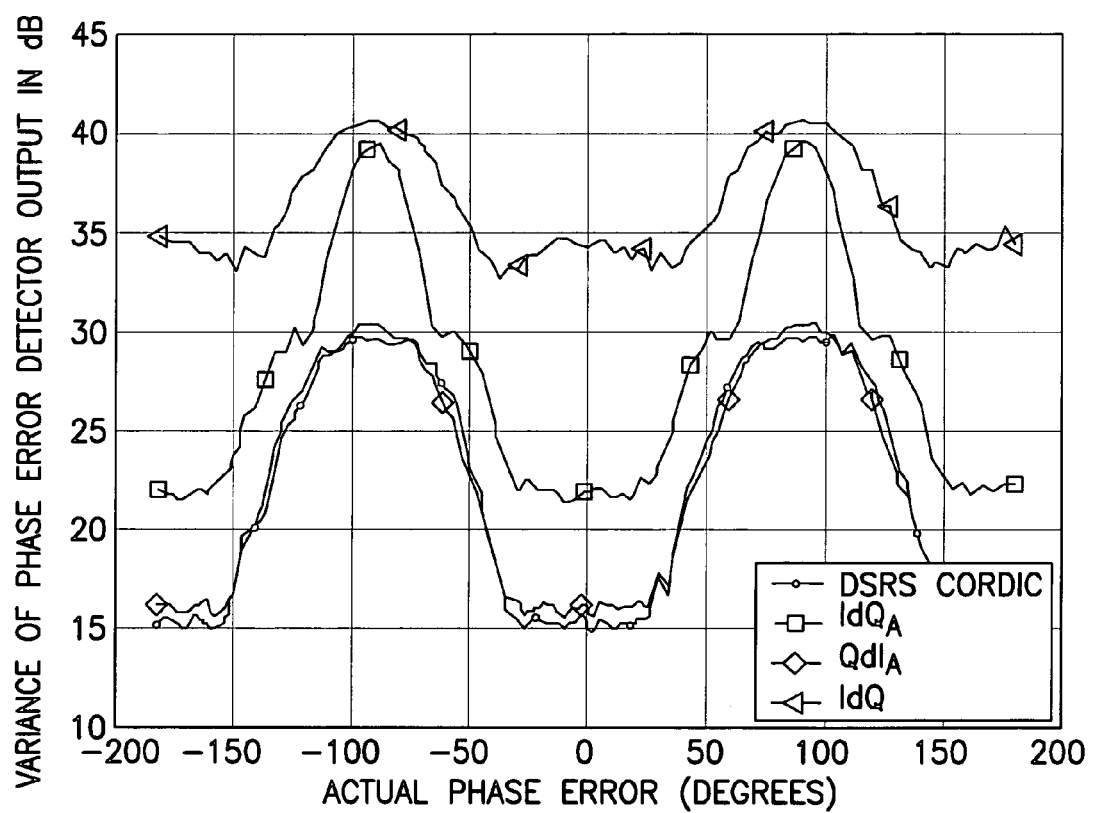
FIG. 6 is a graph showing variance of detector output versus true phase angle error of the four detectors of FIG. 5.

FIG. 6 shows this variance as a function of the true phase angle error for each of the four different phase error detectors plotted in FIG. 5. FIG. 6 shows that the $QdI_A$ and the DSRS CORDIC approach, have nearly identical variance. The $IdQ_A$ has approximately 6 dB higher variance, a result of the fact that there is 6 dB less power in the Q signal than in the I signal. Finally, when compared to the prior art approach of using $IdQ$, the variance of $QdI_A$ is nearly 20 dB lower in the region from −45 to 45 degrees (the region of most interest). Therefore, one would expect that either the DSRS CORDIC approach or the $QdI_A$ will result in lower untracked phase noise at the carrier loop output and hence improved performance.

Relative to the DSRS CORDIC approach, using either $IdQ_A$ or $QdI_A$ (depending on which signal provides the better error signal) requires less complex hardware. The present invention requires despreading, spreading and subtraction whereas the DSRS CORDIC approach requires despreading, spreading, subtraction, and the implementation of a CORDIC.

While there has been illustrated and described what is at present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for estimating a phase error comprising:
   inputting a first signal component spread by a first spreading code and an orthogonal second signal component spread by a second spreading code;
   determining a cross-despread value by despreading the first signal component with the second spreading code;
   calculating an estimate of interference from the second signal component into the first signal component; and
   estimating a phase error by canceling the estimate of interference from the cross-despread value.

2. The method of claim 1 wherein calculating an estimate of interference comprises
   determining an estimate of a data symbol of the first signal component by despreading the first signal component with the first spreading code, and
   multiplying the estimate of the data symbol of the first signal component by the first and second spreading codes.

3. The method of claim 2 wherein calculating an estimate of interference further comprises summing, over all chips per symbol for the second spreading code, the products of the estimates of the data symbols of the first signal component multiplied by the first and second spreading codes.

4. The method of claim 1 wherein the cross-despread value is a first cross-despread value and the estimate of interference is a first estimate of interference, the method further comprising:

determining a second cross-despread value by despreading the second signal component with the first spreading code;

calculating a second estimate of interference from the first signal component into the second signal component; and estimating a phase error comprises calculating $IdQ_C$ by canceling the first estimate of interference from the first cross-despread value, calculating $QdI_C$ by canceling the second estimate of interference from the second cross-despread value, and outputting an estimate of phase error based on at least one of $IdQ_C$ and $QdI_C$.

5. The method of claim 4 wherein outputting an estimate of phase error based on at least one of $IdQ_C$ and $QdI_C$ comprises driving each of $IdQ_C$ and $QdI_C$ to a common rate $IdQ_A$ and $QdI_A$, respectively, and summing the results to obtain the estimate of phase error.

6. The method of claim 5 wherein driving each of $IdQ_C$ and $QdI_C$ to a common rate comprises summing, over a multiple of chips per symbol that is common to both the first signal component and the second signal component.

7. The method of claim 5 wherein outputting an estimate of phase error further comprises, prior to summing the results:

scaling $IdQ_A$ with a scaling factor derived from the second signal component; and scaling $QdI_A$ with a scaling factor derived from the first signal component.

8. The method of claim 7 wherein each of the scaling factors $\lambda_I$ and $\lambda_Q$ are selected to maximize a signal to noise ratio in the estimate of phase error.

9. A phase error detector comprising:

a first input for receiving a first signal component spread with a first component spreading code;

a first despreader having an input coupled to the first input for despreading the first signal component with a second component spreading code associated with a second signal component that is orthogonal to the first;

a second despreader having an input coupled to the first input for despreading the first signal component with the first component spreading code;

a first discriminator having an input coupled to an output of the second despreader for outputting a data symbol estimate of the first signal component;

a first multiplier having an input coupled to the first discriminator for multiplying the data symbol estimate of the first signal component by the first and second component spreading codes; and a first adder having inputs coupled to an output of the multiplier and to an output of the first despreader.

10. The phase error detector of claim 9 further comprising:

a second multiplier having an input coupled to an output of the first adder for multiplying said input by a scaling factor.

11. The phase error detector of claim 9 further comprising a first summing block disposed between the first discriminator and the first adder, said summing block for summing, over all chips per symbol of the second spreading code, the products of the first and second spreading codes.

12. The phase error detector of claim 9 further comprising:

a second input for receiving a second signal component that is orthogonal to the first signal component, the second signal component spread with the second component spreading code;

a third despreader for despreading the second signal component with the first component spreading code;

a fourth despreader in parallel with the third for despreading the second signal component with the second component spreading code;

a second discriminator having an input coupled to an output of the fourth despreader for outputting a data symbol estimate of the second signal component;

a third multiplier having an input coupled to the second discriminator for multiplying the data symbol estimate of the second signal component by the first and second component spreading codes; and a second adder having inputs coupled to an output of the third multiplier and to an output of the third despreader.

13. The phase error detector of claim 12 further comprising:

a second multiplier having inputs coupled to an output of the first adder and to a first scaling factor;

a fourth multiplier having inputs coupled to an output of the second adder and to a second scaling factor; and a third adder having inputs coupled to outputs of the second and fourth multiplier, and an output coupled to a feedback loop.

14. The phase error detector of claim 12 further comprising a second summing block disposed between the second discriminator and the second adder, said second summing block for summing, over all chips per symbol of the first signal component, the products of the first and second spreading codes.

15. The phase error detector of claim 14 further comprising:

a third summing block having an input coupled to an output of the first adder; and a fourth summing block having an input coupled to an output of the second adder, wherein said third and fourth summing blocks operate to provide outputs at a common symbol rate.

16. The phase error detector of claim 15 further comprising a fifth multiplier having inputs coupled to an output of the first adder and to an output of the second discriminator, said fifth multiplier having an output coupled to the input of the third summing block; and a sixth multiplier having inputs coupled to an output of the second adder and to an output of the first discriminator, said fifth multiplier having an output coupled to the input of the fourth summing block.

17. In a phase error detector defining a first input for receiving a first signal component spread with a first spreading code, the improvement comprising:

a first despreader for despreading the first signal component with a second spreading code;

means for determining a first interference term from despreading the first signal component with the second spreading code;

a first combiner for removing said first interference term from said first signal component despread with said second spreading code.

18. In the phase error detector of claim 17 wherein the phase error detector further comprises a second input for receiving a second signal component orthogonal to the first signal component, said second signal component spread with the second spreading code, the improvement further comprising:

a second despreader for despreading the second signal component with the first spreading code;

means for determining a second interference term from despreading the second signal component with the first spreading code;

a second combiner for removing said second interference term from said second signal component despread with the first spreading code.

19. In the phase error detector of claim 18, the improvement further comprising:

a first multiplier for applying a symbol estimate derived from the second signal component to an output of the first combiner;

a first summing block for converting an output of the first multiplier to a common rate;

a second multiplier for applying a symbol estimate derived from the first signal component to an output of the second combiner; and a second summing block for converting an output of the second multiplier to the common rate.

20. The phase error detector of claim 19, the improvement further comprising:

a third multiplier for applying a first scaling factor derived from the second signal component to an output of the first summing block;

a fourth multiplier for applying a second scaling factor derived from the first signal component to an output of the second summing block; and a third combiner for combining scaled outputs of said third and fourth multipliers.

* * * * *